March 29, 1966  C. M. DE WOODY ETAL  3,243,165
STIR-ROD AND AGITATOR UNIT

Filed Aug. 17, 1964  2 Sheets-Sheet 1

INVENTORS
CHARLES M. DeWOODY
ROSCOL L. PEARCE

BY

ATTORNEY

March 29, 1966 C. M. DE WOODY ETAL 3,243,165
STIR-ROD AND AGITATOR UNIT
Filed Aug. 17, 1964 2 Sheets-Sheet 2
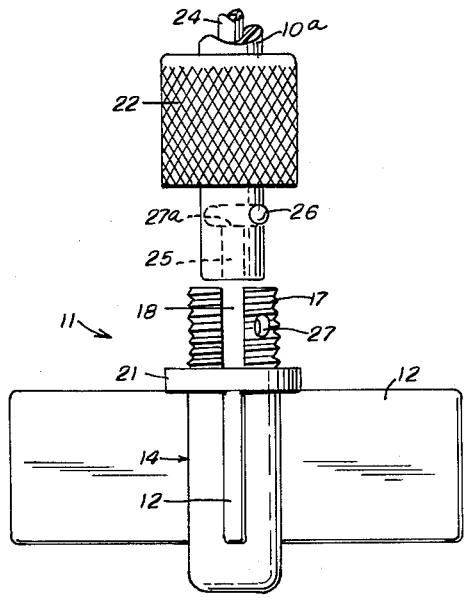
FIG.5
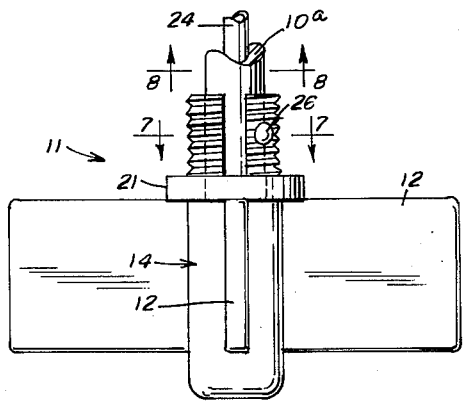
FIG.6
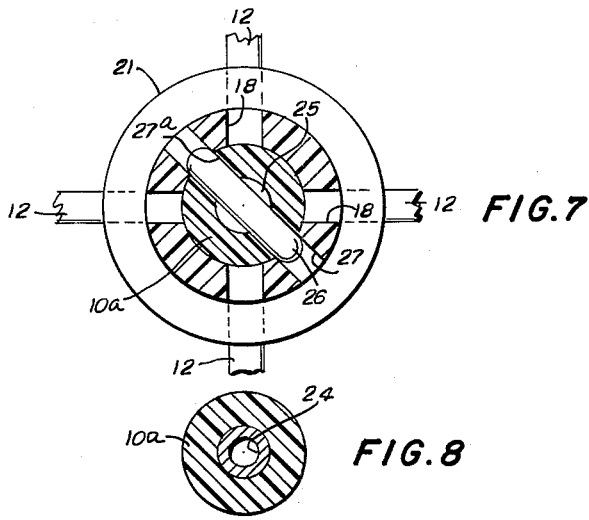
FIG.7
FIG.8
INVENTORS
CHARLES M. DeWOODY
ROSCOL L. PEARCE
BY
ATTORNEY

3,243,165
STIR-ROD AND AGITATOR UNIT
Charles M. De Woody and Roscol L. Pearce, Vineland, N.J., assignors to Ace Glass Incorporation, Vineland, N.J., a corporation of New Jersey
Filed Aug. 17, 1964, Ser. No. 389,960
9 Claims. (Cl. 259—144)

This invention relates to stir-rod assemblies and consists more particularly in new and useful improvements in an assembly for use with laboratory and scientific equipment, such as Morton flasks or for stirring viscous materials.

An object of the invention is to provide a stir-rod assembly having a paddle-type agitator, preferably formed of Teflon, Kel F, or other suitable plastic material, and a stirring rod either of precision ground solid glass or suitable plastic, including a novel locking arrangement which assures a positive grip on the agitator blades, and which can be quickly assembled and disassembled for cleaning.

Another object is to provide a unit or assembly of this nature, wherein alternative agitator blades of varying diameters may be employed with a common stirring rod and locking arrangement.

A further object of the invention is to provide a stirring rod for use with an assembly of the above nature, including means for dissipating heat from local heat concentration points, so as to avoid undue expansion when a plastic stirring rod is employed.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views:

FIG. 5 illustrates a modified form of the invention partially assembled;

FIG. 6 is a similar view illustrating the interlocking parts of the modified assembly;

FIG. 7 is an enlarged sectional view taken on line 7—7 of FIG. 6; and

FIG. 8 is a sectional view taken on line 8—8 of FIG. 6.

Figure 1:
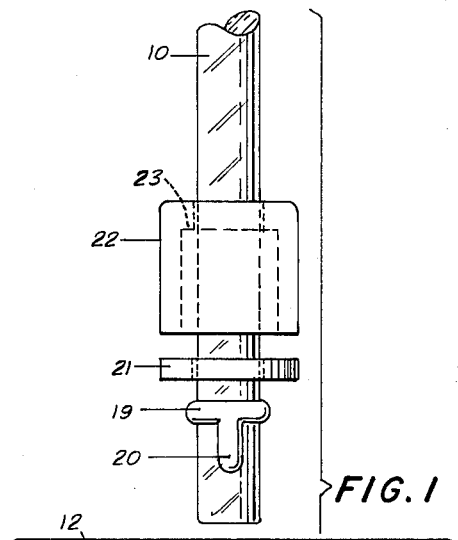
FIG. 1 is an exploded view in side elevation, illustrating the various components of the stir-rod assembly of the present invention.

In the embodiment of the invention illustrated in FIGS. 1-4, the assembly includes a stirring rod 10, preferably of precision ground solid glass, and a paddle-type agitator generally indicated at 11, preferably comprising a pair of right angularly crossed Teflon or Kel F blades 12, provided centrally with complementary vertical slots 13 extending transversely, partially through each blade to enable their assembly in the conventional interlocking manner. A blade mounting head 14 is basically formed of a solid cylinder of a resilient plastic material, such as Teflon, provided with an axial bore 15 which extends longitudinally only partially through the head, terminating at 16 in upwardly spaced relation to the bottom of the head. The upper end of the head 14 is externally threaded to provide a coupling neck 17, and in the embodiment illustrated, four vertical, radial slots 18 extend longitudinally from the top of the neck 17 to a point slightly below the bore bottom 16, as best seen in FIG. 1.

Figure 2:
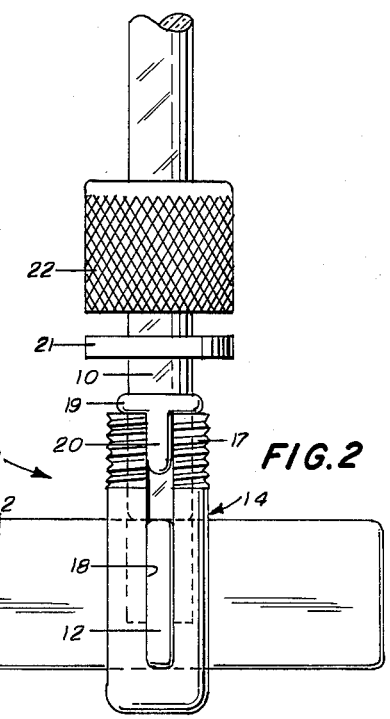
FIG. 2 is a similar view showing the elements partially assembled.

The angular relation and width of the slots 18 is such as to receive the interlocking central portions of the crossed blades 12 with a tight fit, and the length of the slots enables the blades to be inserted in the head with their upper edges lying below the threaded neck 17, as seen in FIG. 2. As will be seen in FIG. 1, the slotted neck and upper portion of the head is inclined to contract radially in the absence of the stir-rod end, due to the slots 18 and resilient nature of the plastic material forming the head. However, upon insertion of the crossed blades in the respective slots and the end of the glass rod 10 in the central bore of the head, the walls of the neck are expanded in close fitting relation to the inserted rod.

After the blades 12 have been inserted in the head 14, the lower end of the glass rod 10 is forced into the bore 15 until it abuts the upper edges of the crossed blades 12, an annular shoulder being formed on the rod 10 and located for abutment with the upper extremity of the threaded neck 17. A radial rib 20 extends from the shoulder 19 on at least one side of the periphery of the rod 10 in the direction of its lower end, and as seen in FIG. 2, this rib is adapted to be inserted in one of the slots 18 in the vicinity of the threaded neck 17, to lock the head against rotary movement with respect to the rod 10.

Figure 3:
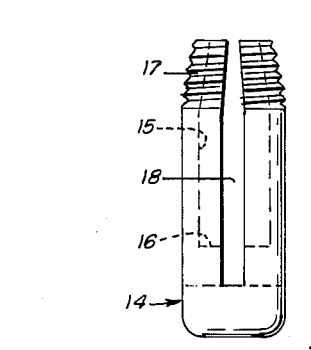
FIG. 3 is an elevational view showing the assembled unit.
Figure 3:
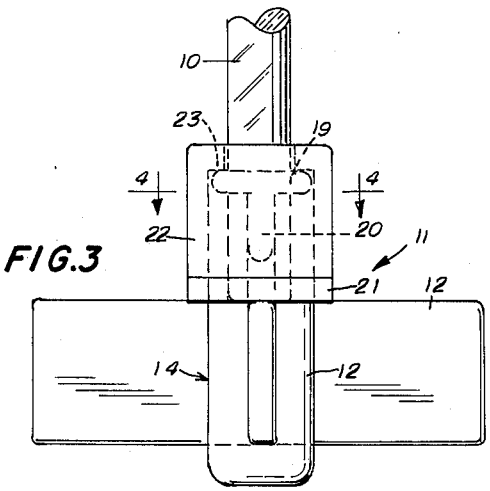
Figure 4:
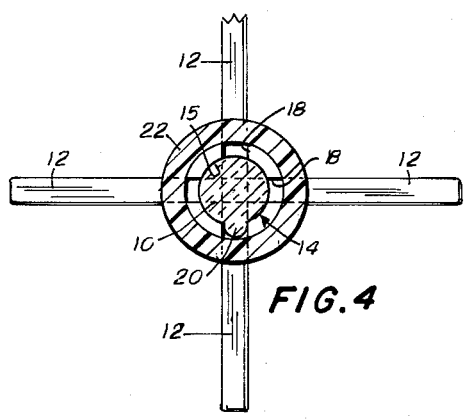
FIG. 4 is a sectional view taken on line 4—4 of FIG. 3.

A plastic retaining ring 21 of an inside diameter complementary to the outside diameter of the head 14, is slidable over the head, as seen in FIG. 3, to prevent overexpansion of the slotted area of the head and neck upon insertion of the glass rod and to facilitate the proper alignment of the threads 17 for receiving the locking collar 22, to be described.

The locking collar 22 is also preferably formed of Teflon or the like, and is internally threaded for engagement with the threads 17 on the neck, an inwardly directed radial flange 23 being designed to abut the shoulder 19 when the collar is screwed tightly on the neck 17 with its lower extremity in abutment with the ring 21.

It will be apparent that with this assembly, the blades 12 are locked against relative movement by their complementary slots 13 and the slots 18 of the head 14, and the head is locked against rotary movement or vertical movement with respect to the glass rod 10 by means of the shoulder 19, the rib 20, and the locking collar 22. The unit may be easily disassembled by simply removing the collar 22, slipping the glass rod out of the bore 15 of the head and removing the blades from the slots 18. Likewise, blades of different diameters are interchangeable through this same method of assembly and disassembly.

A modified form of the invention is illustrated in FIGS. 5-8 inclusive, and here, the glass stir-rod 10 is replaced with a suitable plastic stir-rod 10a. Also, as will hereinafter appear, the agitator paddle locking arrangement is somewhat modified.

Plastic is a notoriously poor heat conductor, and will expand under heat conditions so that when a plastic stirring rod is employed, special means must be provided to facilitate the dissipation of heat from the rod. Thus, the present invention contemplates the provision of a central metal rod or tube 24, preferably the latter, which is inserted in a suitable longitudinal bore in the plastic stirring rod 10a with a forced fit or expanded fit and extending substantially from end to end thereof. This central tube avoids this problem by dissipating heat from the local heat concentrations and heat points to which the stirring rod may be subjected, and thus eliminates expansion of the rod which might otherwise render the device inoperative.

In order to effect an even greater heat dissipation, the central tube 24 may be filled with mercury or other vaporizable material which boils off and takes the heat with it. In this instance, the lower end of the tube 24 is closed by a plug 25, the opposite end of the tube remaining open to permit vapors to escape.

In this modified form of the invention, the assembly of the blades 12 of the agitator and the head 14 is basically the same as previously described. However, the plastic stirring rod 10a omits the integral shoulder 19 and lug 20 embodied in the glass stir-rod, and in place thereof, employs a transverse pin of plastic 26, which extends through aligned openings 27 and 27a in the threaded neck 17 of the head 14 and the end of the plastic stirring rod 24 respectively. As best seen in FIG. 7, opposite ends of the pin 26 which is firmly engaged in rod opening 27a, project radially a slight distance beyond the periphery of the plastic rod 10a, and these projecting ends are preferably rounded as shown. Thus, in the assembly of the unit from the position shown in FIG. 5, the stirring rod can be forced longitudinally into the end of the central bore in the head 14, and due to the resilience of the threaded neck 17 of the head, the rounded ends of the pin 26 temporarily radially expand the threaded neck 17 until they come into registry with the opposed openings 27 in the latter. Thereupon, the ends of the pin snap into place so as to prevent both rotary and vertical movement of the agitator assembly with respect to the stirring rod 10a. Then, when the collar 22 is screwed in place, the slotted neck is compressed around the rod and further locks the structure in place. As seen in FIG. 7, the ends of the pin 26 are inwardly spaced from the periphery of the neck 17 a sufficient distance to avoid interference with the threaded engagement of the collar on the neck threads.

The retaining ring 21 is of particular importance in this modified form of the invention when the end or ends of the pin 26 are snapped into the openings 27a. In other words, during the expansion of the neck 17, as the rod and pin are being forced into the bore 15, prior to entry into opening or openings 27, such expansion is confined to the neck by the encircling ring and undue expansion of the slotted head per se, which is in engagement with the crossed blades, is prevented.

It may also be noted that the radial openings 27 in the threaded neck 17 of the head, may be eliminated, in which event the projecting ends of the pin 26, held firmly in the opening 27a of plastic stirring rod 10a, may be inserted in the radial slots 18 in a manner similar to the rib 20 in the glass rod embodiment previously described. Thus, rotary movement of the agitator with respect to the rod is prevented, and the engagement of the internal flange in the collar 22 with the end of the neck prevents vertical displacement.

It will be apparent that both of the embodiments of the invention herein described provide a very practical stirring unit which is simple in construction and easily assembled and disassembled, and one which is adaptable to a wide variety of laboratory uses.

From the foregoing, it is believed that the invention may be readily understood by those skilled in the art without further description, it being borne in mind that numerous changes may be made in the details disclosed without departing from the spirit of the invention as set forth in the following claims.

We claim:

1. A stir-rod and agitator unit, comprising a substantially tubular agitator mounting head of semi-rigid resilient material, at least one longitudinal slot dissecting said head from its upper end to a point anterior to its lower extremity, said dissected upper end including means forming an externally threaded tubular neck, at least one radially projecting agitator blade slidable into said slot with a close fit and of a depth to clear the threads of said neck when inserted in said slot, a stirring rod having an end insertable in said tubular head through said neck, means on said rod adjacent said end, projecting radially beyond at least one side of the periphery of said rod in locking penetration with respect to the adjacent wall of said neck, to prevent relative rotary movement between said head and rod, and a threaded locking collar encircling said rod and threadedly engaging said neck for constricting the latter and locking the assembly.

2. A unit as claimed in claim 1, including a retaining ring encircling said neck adjacent said agitator blade.

3. A unit as claimed in claim 1, wherein the means on said rod end for locking penetration with the wall of said neck, comprises a radial peripheral rib engageable in one of said slots.

4. A unit as claimed in claim 1, wherein said means on said rod end for locking penetration with the wall of said neck, comprises a pin inserted transversely through said rod with at least one end projecting radially for engagement with one of said slots.

5. A unit as claimed in claim 1, wherein the means on said rod end for locking penetration with the wall of said neck, comprises a pin inserted transversely through said rod with at least one end projecting radially from the periphery of the latter, said neck being provided with at least one radial opening for receiving said projecting end to prevent relative vertical and rotary movement between the neck and rod.

6. A unit as claimed in claim 5, wherein the projecting end of said pin is rounded, whereby, through the resilience of the material of said tubular neck, said rod may be longitudinally inserted in the latter until said projecting end of said pin snaps into said radial neck opening.

7. A stir-rod and agitator unit as claimed in claim 1, wherein said stirring rod is formed of plastic material and provided with a central, longitudinally extending metal core for dissipating heat from said rod.

8. A stir-rod and agitator unit as claimed in claim 7, wherein said metal core is in hollow, tubular form and adapted to receive a vaporizable fluid to facilitate heat dissipation.

9. A stir-rod and agitator unit comprising a substantially tubular agitator mounting head of semi-rigid, resilient plastic material, two right angularly intersecting longitudinal slots extending laterally through said head from its upper end to a point anterior to its lower extremity, the slotted upper end of said head including means forming an externally threaded tubular neck, a pair of right angularly crossed, interlocking plastic agitator blades slidable into respective slots with a close fit, said plastic agitator blades projecting laterally from said head and being of a depth to clear the threads of said neck when inserted in said slots, a glass stirring rod having an end insertable in said tubular head through said neck, a radial shoulder spaced from said end of said rod for abutment with the upper end of said neck, a longitudinally depending rib on the periphery of said rod adjacent said shoulder for engagement in one of said slots to prevent relative rotary movement between said head and rod, and a threaded retaining collar encircling said rod and threadedly engaging said neck for constricting the slotted head and locking the assembly.

References Cited by the Examiner

UNITED STATES PATENTS

| | | | |
|---|---|---|---|
| 629,806 | 8/1899 | McCormick | 259—108 |
| 931,100 | 8/1909 | Valy | 259—144 |
| 1,116,568 | 11/1914 | Cretors | 259—107 |
| 1,461,468 | 7/1923 | Trust et al. | 259—134 |
| 1,479,511 | 1/1924 | Parsons | 259—144 |

FOREIGN PATENTS 164,086  9/1949  Austria.

OTHER REFERENCES

The Review of Scientific Instruments, vol. 27, No. 12, December 1956, pp. 1080–1081.

WALTER A. SCHEEL, *Primary Examiner.*

WILLIAM I. PRICE, *Examiner.*